Feb. 12, 1957  E. L. KUSKIE  2,781,138
ATTACHMENT FOR CORN SHELLERS
Filed May 17, 1954  3 Sheets-Sheet 1
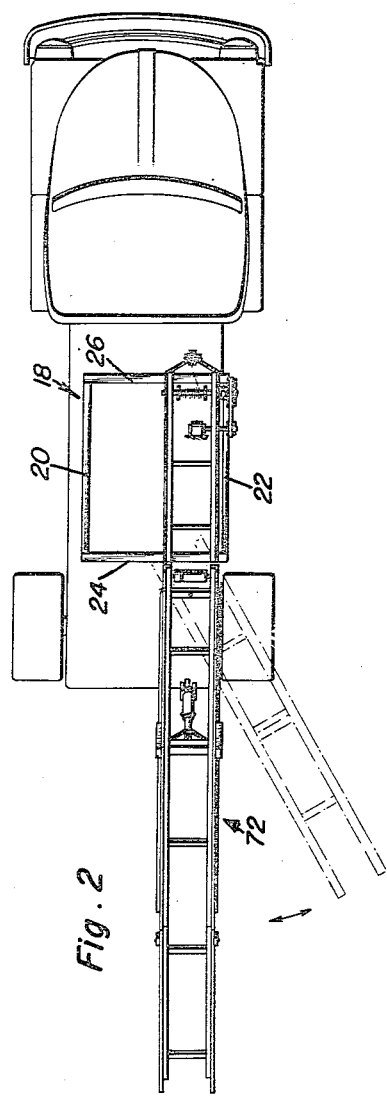
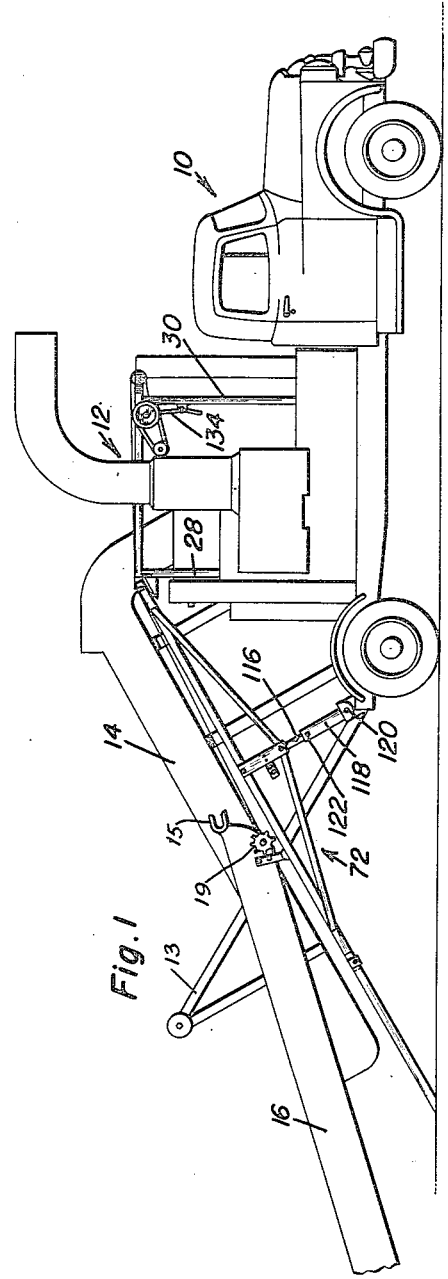
Elsmer L. Kuskie
INVENTOR.
BY *Clarence A. O'Brien*
*and Harvey B. Jacobson*
Attorneys

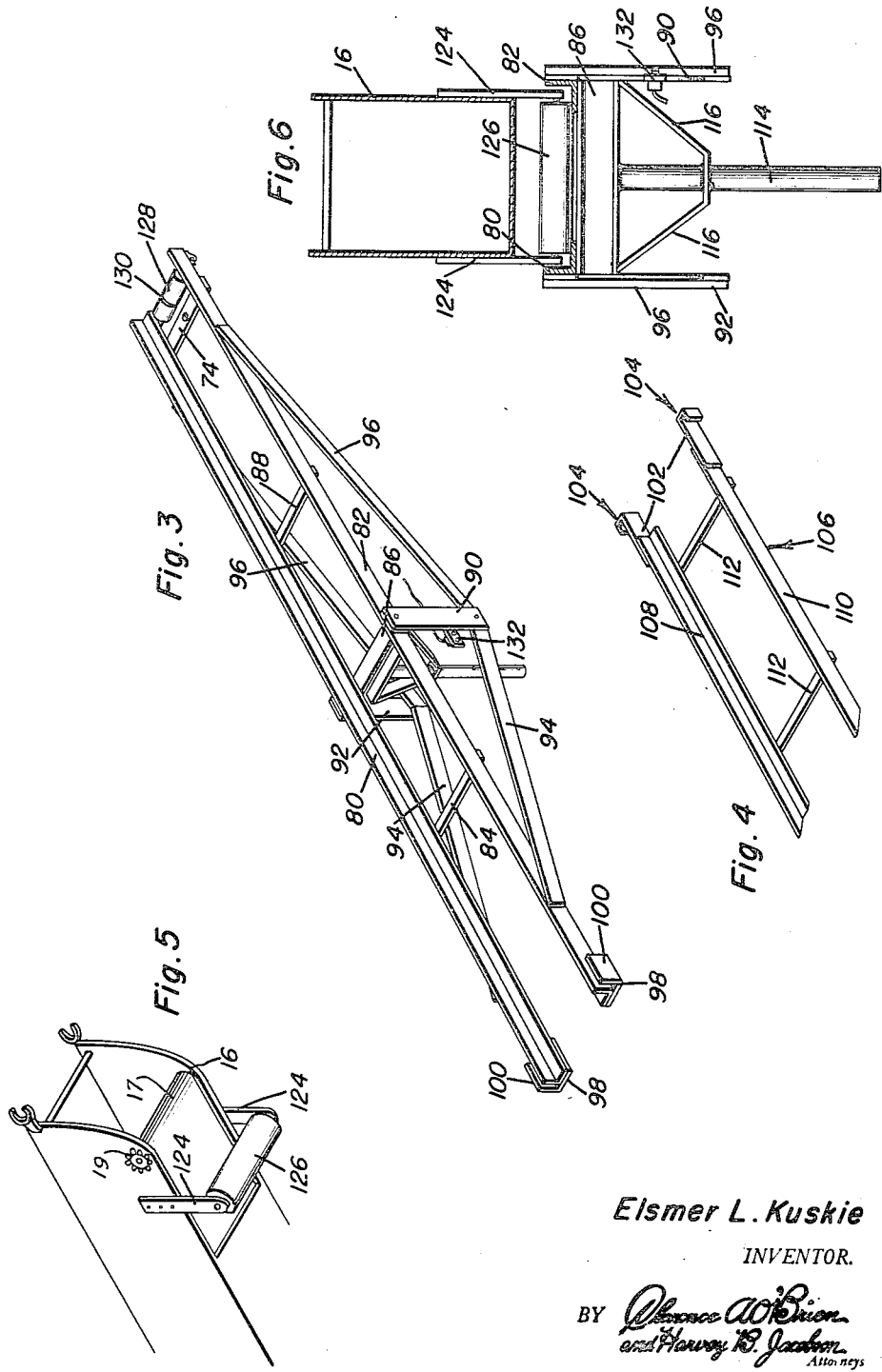

Feb. 12, 1957 E. L. KUSKIE 2,781,138
ATTACHMENT FOR CORN SHELLERS
Filed May 17, 1954 3 Sheets-Sheet 3
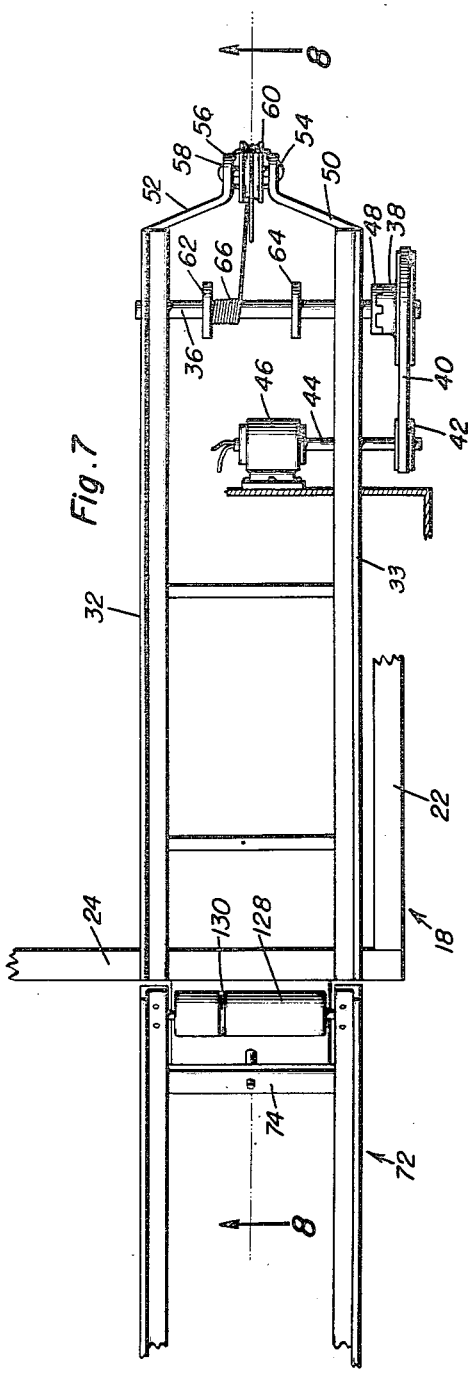
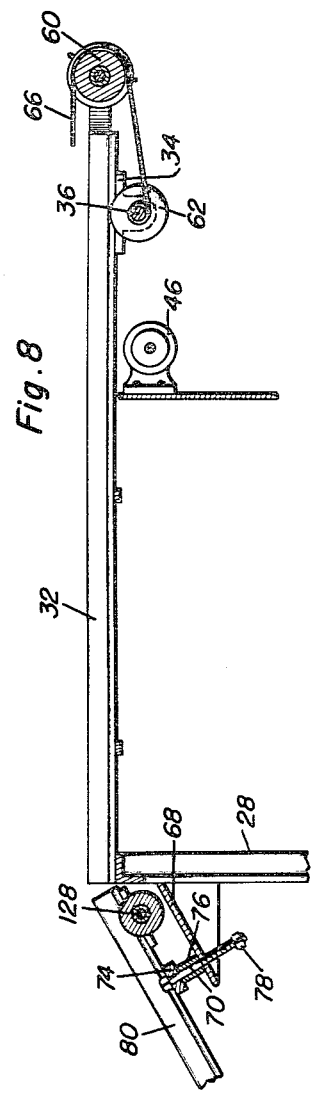
Elsmer L. Kuskie
INVENTOR.

United States Patent Office 2,781,138
Patented Feb. 12, 1957

2,781,138
ATTACHMENT FOR CORN SHELLERS

Elsmer L. Kuskie, Central City, Nebr.

Application May 17, 1954, Serial No. 430,332

1 Claim. (Cl. 214—83.26)

This invention relates to farm machinery and pertains more particularly to a drag carrying attachment for mobile corn shellers.

A primary object of this invention is to provide an attachment for mobile corn shellers which will be capable of supporting the drag unit thereon in such manner that they may be easily and quickly loaded and unloaded and that when positioned for transportation they will not increase the effective width of the mobile unit beyond practical and usable limits.

Another object of this invention is to provide a drag loading and carrying attachment for corn shellers which incorporate a pivoted loading ramp adapted to materially expedite the loading and unloading of the drag assembly on the carrier platform.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a mobile corn sheller employing the drag carrying attachment and showing the drag section in the process of being loaded upon the platform;

Figure 2 is a plan view of a corn sheller provided with the attachment;

Figure 3 is a perspective view of the loading ramp;

Figure 4 is a perspective view of the loading ramp extension;

Figure 5 is a partial perspective view of the forward end portion of one of the drag sections;

Figure 6 is a transverse sectional view through the loading ramp showing a drag section guided for movement therealong;

Figure 7 is an enlarged plan view of the loading ramp assembly and carrying platform; and Figure 8 is a vertical section taken substantially along the plane of section line 8—8 of Figure 7.

Referring now more particularly to the drawings, reference numeral 10 indicates generally an automotive truck which forms a mobile base for the corn sheller assembly indicated generally by the reference character 12 mounted thereon. The specific details of the corn sheller form no part of this invention and the corn sheller may be of any conventional and well known construction which includes a conveyor portion 14 and a sectional drag adapted to be connected thereto for cooperation with the conveyor for feeding the corn to the sheller mechanism proper. Such drags are usually sectionalized and usually consist of two or more articulated sections, one such section being shown partially in Figure 1 and illustrated by the reference character 16. The section 16 is adapted to be detachably attached to a bracket 13 on the conveyor portion 14 by couplings, as at 15, and includes a conveyor 17 adapted to be driven by a sprocket wheel 19 from a sprocket and chain drive, not shown, on the conveyor portion 14 all of which is conventional and well known in the art.

Conventionally, brackets or carrying arms are provided at the side of the truck for the purpose of supporting the detached drag section when it is desired to move the mobile unit from place to place, the drag sections being manually loaded upon the brackets and unloaded therefrom in a similar manner. This not only imposes a tedious task upon the operator but also increases the effective width of the automotive truck when the carrier sections are in place for transport making it dangerous and in some states unlawful to proceed along public highways with the vehicle thus loaded.

To overcome the objections, this invention contemplates the provision of a generally open rectangular platform 18 mounted above the usual corn sheller assembly and consisting of the spaced side pieces 20 and 22 interconnected at their opposite ends by the end cross members 24 and 26, the platform employing suitable extending leg members 28 and 30 to support the platform in the elevated position. The platform further incorporates a pair of spaced parallel angle members 32 and 33 extending longitudinally on the upper surface of the platform and carrying suitable bearing blocks 34 adjacent their forward ends for rotatably receiving the transverse horizontal winch shaft 36 therebetween. Rotatably carried on one end of the winch shaft is a pulley member 38 connected by means of a flexible belt 40 to the pulley 42 on the drive shaft 44 of an electric motor 46. A clutch element 48 is slidably received and connected for rotation with shaft 36 and is engageable with the pulley member 38 to establish a drive connection between the pulley and the shaft 36.

The angle members 32 and 33 are provided at their forward ends with converging arm members 50 and 52 terminating in spaced parallel leg portions 54 and 56 which carry a pivot shaft 58 therebetween upon which a pulley member 60 is rotatably received. The winch shaft 36 is provided at spaced points therealong with collar members 62 and 64 between which a cable 66 is adapted to be guidably wound on the shaft with the cable issuing therefrom over the pulley 60 to a point of attachment of a drag section, such as that illustrated by the reference character 16. The purpose of this construction is to provide means for rapidly and easily loading the drag sections upon the platform assembly 18.

For the purpose of elevating the drag sections to the level of the platform 18, the rear portion thereof is provided with the table or apron 68 having an aperture therethrough loosely receiving a pivotable member 70. The table 68 provides a support for the ramp assembly indicated generally by the reference character 72 which is provided at its forward end with a cross bar member 74 suitably apertured to receive the pivot bolt 70 through which this member projects. A spacer sleeve 76 is interposed between the cross bar 74 and the apron 68 in surrounding relation to the pivot bolt 70 and it is to be noted that the stop nut 78 of the pivot bolt is disposed a substantial distance below the undersurface of the apron 68 the purpose of which will become presently apparent. The loading ramp consists essentially of a pair of spaced side frame members 80 and 82 of angle configuration and disposed in spaced parallel relationship, being interconnected by suitable cross frame members 84, 86, and 88 as well as the previously mentioned cross member 74. To further rigidify the loading ramp, depending legs 90 and 92 are disposed on opposite sides thereof substantially medially of the length of the side members 80 and 82 and these legs are rigidly connected to one end of the diagonal brace members 94 and 96 extending therefrom to adjacent opposite ends of the side frame members.

The rearward or trailing end of the side frame members 80 and 82 are provided with angle pieces 98 having their upstanding leg portions 100 spaced slightly from the upstanding legs of the side members and are adapted to receive therebetween the shank portions 102 of the J-shaped attaching brackets 104 attached to the forward end of the detachable trailing extension section 106 of the loading ramp. The section 106 is provided with angle side members 108 and 110 forming extensions of the side frame members 80 and 82, respectively, previously described, and these members are interconnected by the cross braces 112. It will be readily appreciated that the J-shaped brackets 104 taken in conjunction with the angle pieces 98 form a means for readily attaching and detaching the trailing section to the loading ramp assembly proper.

The cross member 86 of the loading ramp preferably takes the form of an I-beam section and has welded to its undersurface substantially medially thereof and in depending relation thereto a short length of tubular or rod-like member 114 suitably braced as by the straps 116 and this tubular member is adapted to be received in a tubular socket 118 pivotally attached as by horizontal pin 120 to the rear end of the automotive truck frame. The member 116 is provided with a series of longitudinally spaced apertures cooperable with the pin member 122 projecting through the tubular member 118 for rigidly interconnecting these members and lending support to the center portion of the loading ramp.

As will be seen most clearly in Figure 5, the drag sections 16 is provided at opposite sides thereof adjacent their forward ends with depending legs 124 which journal a roller member 126 therebetween, which, as will be seen, from Figure 6, is received between the side frame members 80 and 82 of the loading ramp and the side members 108, 110 of the extension. Thus, when the cable 66 is attached to the drag section and the motor 46 connected with the shaft 36, the drag section will be moved up the loading ramp and onto the platform within the confines of the rail members 30 and 32 thereof. From that position, the drag section may be manually moved to the opposite side of the platform.

For the purpose of guiding the drag section onto the track members 32 and 33 from the loading ramp and for the purpose of guiding the cable 66, a roller member 128 is journalled between the forward end of the side members 80 and 82 in such a manner that the roller projects slightly above the horizontal leg portion to properly guide the drag section onto the track members 30 and 32. The roller 128 is grooved as at 130 to provide a guide for the cable 66.

For the purpose of controlling the motor 46, a suitable manual switch member 132 is connected to a depending leg 90 of the loading ramp assembly in the manner shown most clearly in Figures 3 and 6 and it is also to be noted that the clutch member 48 is controlled by means of a depending control arm 134 in the manner shown most clearly in Figure 1.

The provision of the pivot pin for the ramp enable the ramp to be lifted up to disengage the tubular members 116 and 118 and allow the ramp to be swung to one side of the sheller assembly to permit the conventional conveyor to be positioned as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In a corn sheller having a mobile base and at least one drag unit adapted to be loaded on the sheller when not in use, a raised platform for supporting the loaded drag unit, a pair of legs on said base supporting the platform, means for loading the drag unit onto the platform comprising a loading ramp adapted to incline downwardly and rearwardly from said platform and having a front end provided with a roller for guiding the drag unit onto the platform, and means for attaching said ramp to said legs and base for vertical adjustment comprising an apron on said legs inclining downwardly and rearwardly therefrom adjacent the platform, a pivotal member depending from said front end and loosely extended through said apron, a spacer on said pivotal member between said apron and front end for spacing said roller above the apron, a telescopically adjustable support extending between an intermediate portion of said ramp and said base and terminally pivoted to said base for swinging about an axis transverse to said ramp, and means on said support for locking the same in vertically adjusted positions.

References Cited in the file of this patent

UNITED STATES PATENTS

| | | |
|---|---|---|
| 1,392,835 | Levin | Oct. 4, 1921 |
| 2,188,374 | Sanchez | Jan. 30, 1940 |
| 2,665,020 | Whittle | Jan. 5, 1954 |
| 2,705,081 | Jacobs | Mar. 29, 1955 |

FOREIGN PATENTS

| | | |
|---|---|---|
| 180,947 | Great Britain | June 8, 1922 |